Sept. 20, 1971  P. M. HIRSCH ET AL  3,606,515
METHOD OF MANUFACTURING WAVE SHAPING OBJECTS
Filed Nov. 25, 1968                2 Sheets-Sheet 1

Peter M. Hirsh
James A. Jordan
Louis B. Lesem
INVENTORS

BY John L. Jackson

ATTORNEY

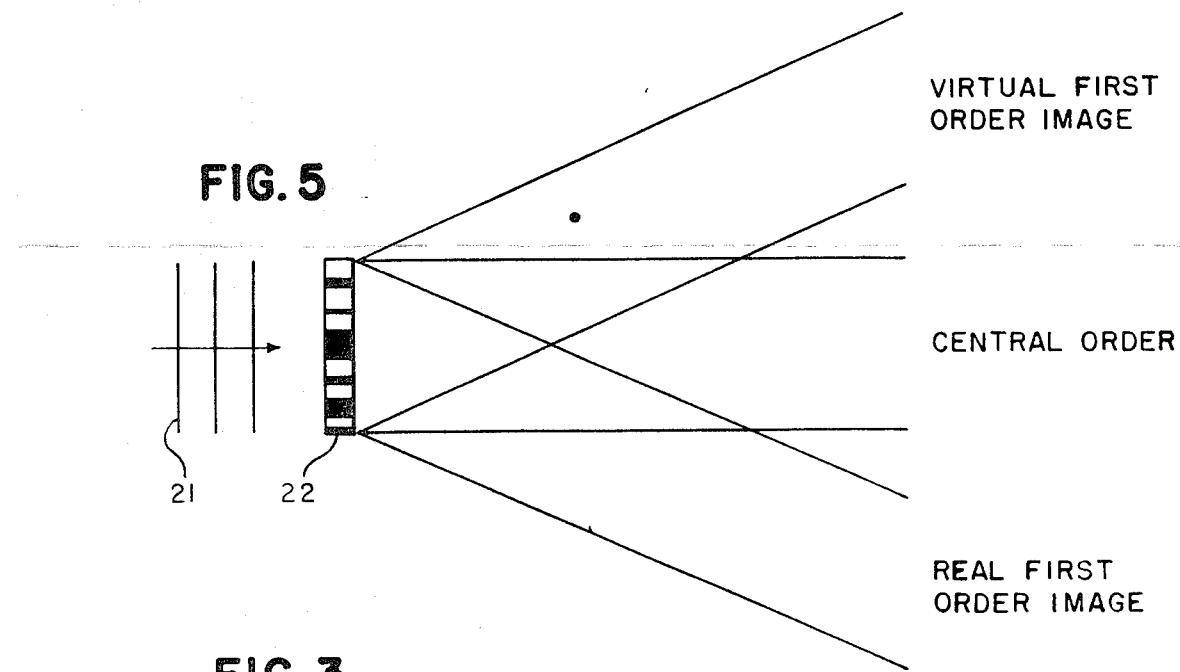
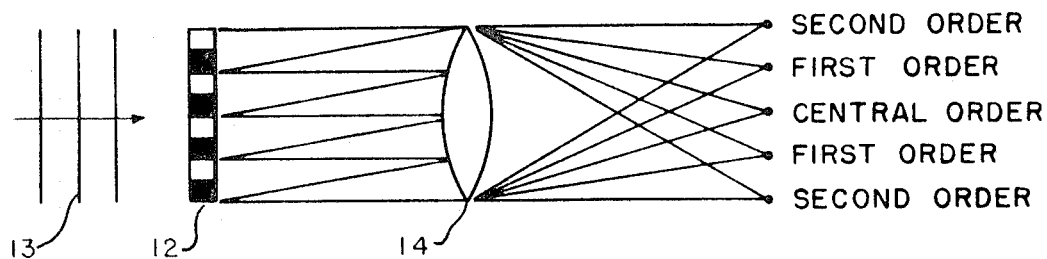
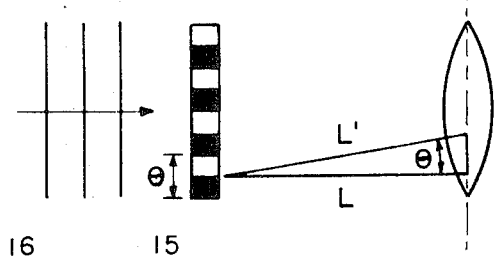
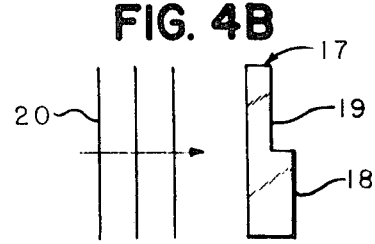
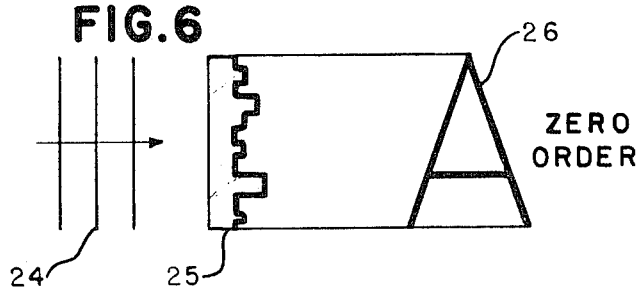

United States Patent Office 3,606,515
Patented Sept. 20, 1971

3,606,515
METHOD OF MANUFACTURING WAVE SHAPING OBJECTS
Peter M. Hirsch, James A. Jordan, Jr., and Louis B. Lesem, Houston, Tex., assignors to International Business Machines Corporation, Armonk, N.Y.
Filed Nov. 25, 1968, Ser. No. 778,525
Int. Cl. G02b 27/38
U.S. Cl. 350—3.5
15 Claims

ABSTRACT OF THE DISCLOSURE

The technique is for arbitrarily altering a physical (e.g., electromagnetic or sound) wavefront, in which the wavefront is shaped by modifying its phase in a controlled manner. A first assumption is made that the image to be formed is of an object made up of point sources with the phases of the rays from each source being random. The random phases assumption permits the second and further assumption that the amplitude of the wavefront, incident on a plane, is constant. Therefore, the wavefront is shaped solely by operating on its phase.

The wavefront scattered from an object is first, in the preferred embodiment, calculated digitally and the calculation is identical to that used to calculate the wavefront as in conventional digital holography when a point aperture object assumption is made. The phase of each point in the wavefront is determined and a plot tape written for a plotter, the phase information scaled from 0 to $2\pi$ over the gray levels available, such that a photographic film is produced, the darkening of which over its area is a measure of phase. The thus produced film is then photo-reduced to give a phase distribution at the appropriate wavelength of light. The photo-reduction is then bleached such that the emulsion is of uniform transmissivity but with an etched surface, the etch depth of which is proportional to emulsion darkening. Upon illumination the waves incident upon the photo-reduction are selectively retarded by the thickness differences of the emulsion such that the resultant interference at an image plane produces the desired image.

BACKGROUND OF THE INVENTION

Field of the invention

This invention relates to computer-generated holograms in general, and more particularly, to a technique in which holographic type members are produced digitally which do not contain the spurious orders normally attendant both computer-generated holograms and optically-generated holograms.

Description of the prior art

Holography is a twenty-year-old science of image formation from physical diffraction patterns. In the original work, images were obtained from re-illuminated optical diffraction patterns. The optical diffraction patterns were produced by means of an on-axis photographic system. The reference wavefront of the original on-axis holograms was provided by the light which passed undiffracted around a small object placed in its path. Each point on the object formed an interference pattern of rings. These patterns were similar to Fresnel zone plates and acted as small lenses to focus a collimated, reconstructing beam into an image point. The wavefront upon reconstruction, which converged to a point in front of the hologram, formed a real image and the wavefront diverging from an apparent point of origin behind the hologram formed a virtual image. Upon observation of the real image, the light from the virtual image and undiffracted light formed a background illumination which decreased the contrast of the real image. This was the principal disadvantage of on-line holography.

With the advent of lasers, a coherent light source was available, which provided light which was spatially coherent over a relatively large area and which was temporally coherent for a limited time duration. The coherent properties of laser light have made possible the rapid development of optical holography in the past few years. Further, other wave phenomena such as ultrasonic waves or microwaves have been shown to be feasible for holograms.

In an attempt to separate the desired image obtained upon illumination of a hologram, from the noise and unwanted image, an off-axis or beam-splitting system, was developed in which the desired image was formed upon illumination in an area separated from the spurious patterns and low frequency noise. While good image quality was obtained through use of the off-axis technique, this technique still had the disadvantage that it used the incident reconstruction energy in a very inefficient manner, in that much undiffracted light still passed through to the zero order and additionally, much of the energy was diffracted into orders or regions, which were not used. The subject invention provides a technique for constructing holographic type members which have all of the advantages of the holograms, but which do not, upon reconstruction, allow the reconstruction energy to pass undiffracted into the zero order, or form images in undesired regions or orders.

Another problem associated with holograms encountered where they are computer-generated is that an inordinate amount of time computer-wise is required to calculate the wavefront, since during the calculations, the zero order and other undesirable regions had to be accounted for and thus to prevent overlap, higher spatial frequencies were required than were necessary to actually construct a desired image. Thus, in many cases, the utilization of computer-generated holograms was economically prohibitive.

SUMMARY OF THE INVENTION

The phase change needed to transform a simple wavefront, for instance, a spherical wave, into the required wavefront is calculated. During this calculation, an assumption is made that the amplitude is a constant (which assumption is partially based on a theorem of Lord Rayleigh). The phase distribution is plotted on a plotter with the phase proportional to intensity. A photographic reduction of the plot is made, and the resultant negative bleached. The bleaching is performed in a controlled manner and the emulsion must be such that the light incident upon a region of $\phi=0$ will be retarded by one light wavelength compared to the light incident upon the region of $\phi=2\pi$. When phase matching is achieved, almost all of the light incident upon the object during illumination will be used to form the image. There are no spurious orders

BRIEF DESCRIPTION OF THE DRAWINGS

FIG. 3 is a view of a plane grating and lens system illustrating the focusing of rays incident upon the lens from the grating into various orders centered around a central order;

FIG. 4a is a more detailed view of rays from a grating incident upon a lens;

FIG. 4b is a view illustrative of on-axis method of producing a phase change through use of different thicknesses of glass;

FIG. 5 is a view illustrating the diffraction of the incident reconstruction light by an off-axis hologram into several orders;

FIG. 6 is a view illustrative of the method of phase retardation used in the subject novel kinoform to produce an image.

DETAILED DESCRIPTION OF THE DRAWINGS

Figure 1:
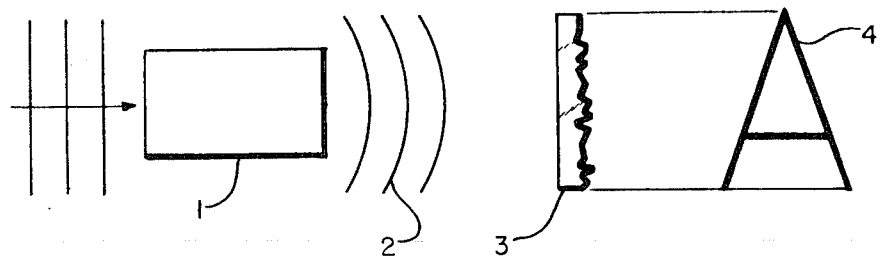
FIG 1 is an overall view of a kinoform reconstruction system.

In FIG. 1 is shown a generalized illustration of a technique for producing an image. In the following description, the object 3 which, upon illumination provides an image, will be referred to as a kinoform. As shown in FIG 1, a light source 1 such as a laser emits a known wavefront, illustrated by spherical waves 2. The wavefront is incident on the kinoform 3. The waves 2 are retarded in a controlled manner, such that their phases are changed and interference occurs which produces an image 4.

The kinoform forms an image from the incident light as follows. Consider two waves, both incident upon a piece of glass, divided into two sections, with one section thicker than the other. If one wave is incident on the thicker section and one on the thinner section, the wave incident on the thicker section will be retarded relative to the wave incident on the thinner section, since the velocity of light in glass is less than that in air. Once both waves are in the glass, they travel at the same velocity, and they will also have the same velocity once they again re-emerge into air. The net result, however, is that when they emerge into the air, the wave which passed through the thicker section is retarded relative to the one that passed through the thinner section. This retardation of the one wave relative to the other, will produce an interference pattern when the waves are propagated away from the glass. The kinoform is an object made up of many such sections, to provide a phase object which retards the phases in an arbitrary manner.

Figure 2A:
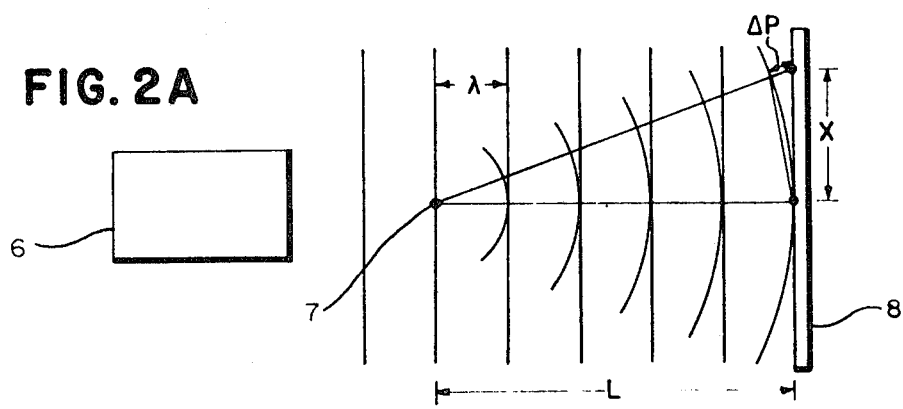
FIG 2a is a view of a Gabor or on-axis holographic system.
Figure 2B:
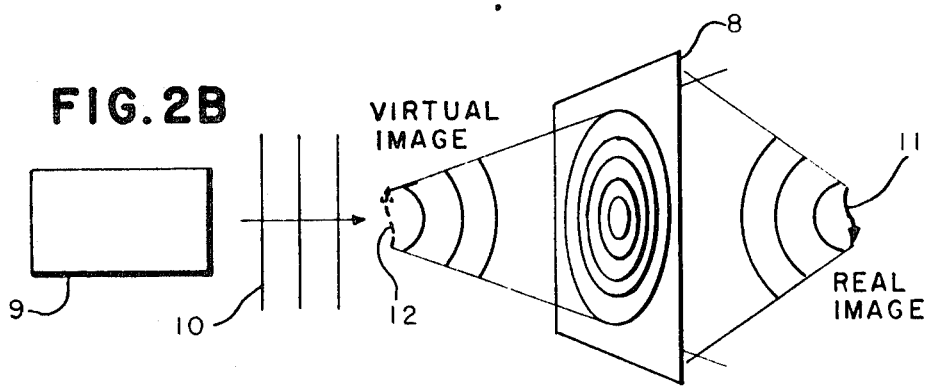
FIG. 2b is a view illustrating the on-axis alignment of the real and virtual images of an on-line hologram upon reconstruction.

To aid in an appreciation and understanding of the subject novel technique, refer next to FIG. 2a, where there is shown an illustration of the original optical holographic technique. In FIG. 2a a light source 6 provides a reference wavefront which is the plane wave which is undiffracted since it passes around the object 7. If the hologram 8 is a distance L from the object, the optical path length difference between the undiffracted reference waves and the object waves is the perpendicular distance to the hologram, from the object, minus the length of a ray to a point X from the object. Therefore, the difference in the path length $\Delta P = L - (X^2 + L^2)^{1/2}$. Thus, the reference wavefront is provided by the light which passes undiffracted around the small object placed in its path. Each point on the object forms an interference pattern of rings 13 (FIG. 2b) and each of these patterns is similar to a Fresnel zone plate, and acts as a small lens upon illumination which can focus the reconstructing beam into an image point. As illustrated in FIG. 2b, the reconstructing wave 10 from the source 9 is focused by means of the hologram 8 into a point in front of the hologram to form the real image 11 and the diverging beam from an apparent point of origin behind the hologram forms a virtual image 12. As can be seen from a consideration of FIG. 2b, the real image and virtual image are on-line and as previously discussed, this along with the undiffracted light severely limits the image obtained upon reconstruction from an on-axis hologram.

A mathematical analysis of the on-line technique can be made by considering a transmission object illuminated by a coherent light wave. The diffraction pattern is recorded by the photographic plate or film at the hologram plane. For convenience, the object is described by a transmittance function, $T(a,b) = T_B + T_r(a,b)$ where $T_B$ is the average transmittance of the object and $T_r(a,b)$ is the deviation from the average at the point $(a,b)$ on the object plane. If a coherent wave of unit amplitude is incident upon the object, the wavefront at the hologram plane is given by:

$$h(x,y) = \int T(a,b) F(x-a, y-b) \, da \, db$$

where F is an appropriate complex valued function, which describes the propagation of the wave from the point $(a,b)$ on the object plane to the point $(x,y)$ on the hologram plane. The term $h(x,y)$ can be written in convolution notation:

$$h(x,y) = T * F(x,y)$$

This complex valued function $h(x,y)$ describes the wavefront of the light diffracted by the object. This is the wavefront that a viewer would observe upon looking at the object from the hologram plane. It should be further noted that the wavefront is a complex valued function and that it thus can be described by an amplitude and a phase:

$$h(x,y) = C(x,y) \exp[i\phi(x,y)]$$

Both the amplitude C and phase $\phi$ must be recorded in order to provide a complete description of the wavefront. Detectors of electromagnetic waves of optical frequencies, however, are not sensitive to both the amplitude an phase of the wave. Instead, these detectors are sensitive to the intensity of the wave, i.e., to $I = |h|^2 = C^2$. These detectors are referred to as "square law" detectors.

Using the convolutional notation, it follows that the darkening of the emulsion of the film is a function of:

$$H(x,y) = |h|^2 = |T_b * F|^2 + T_b(T_r * F) + T_b \overline{(T_r * F)} + |T_r * F|^2$$

where the notation $\overline{X}$ indicates the complex conjugate of X.

When the hologram is illuminated by a second coherent wave of the same form as the first, the resultant wave form is equivalent to convolving $H(x,y)$ with $F(x,y)$ which results in:

$$P(u,v) = |T_b * F|^2 * F + T_b(T_r * F) * F + T_b \overline{(T_r * F)} * F + |T_r * F|^2 * F$$

The third term of this expression can be reduced to $T_b T_r$ indicating that reconstruction of the information carrying part of $T(a,b)$ can be accomplished. The other terms in this expression contribute only to spurious degradation of the image as above indicated.

In an attempt to overcome the image degradation problems, off-axis holography was perfected. To aid in an analysis of off-axis holography, refer next to FIG. 3, which is a view of a horizontally-lined diffraction grating 12, having incident thereon plane waves 13. The horizontally-lined grating is made up of equally spaced light and dark regions. The waves 13 are diffracted in a conventional manner by the grating and imaged by means of lens 14, as shown into the central or 0 order, the positive first and second orders, and the negative first and second orders. Additional orders not shown, are also present. The transmitted amplitude from the lens varies according to the expression $A_t = a + b \cos 2\pi \, dy$, where $A_t$ is the transmitted amplitude, $y$ is the vertical coordinate in the plane of the grating, $1/d$ is the frequency of the grating, and $a$ and $b$ are constants which determine the average transmission and the contrast of the grating, respectively. If $b$ is less than $a$ the grating will put light of amplitude $a$ into the zero order and in the first order on each side light of ½ $b$ amplitude will be present. Thus, it can be seen that the amplitude of light diffracted into each of the first orders is proportional to $b$. Thus, a significant amount of incident light is present in the central order and light of *equal* intensity is present in both first orders.

For further analysis, refer next to FIG. 4a, which shows a diffraction grating in more detail. Light is emitted at various angles from the grating and constructive interference occurs when the distance L' from the grating 15 to the lens 16 is one or more integral wave lengths longer than the direct distance L. Thus, upon analysis it will be seen that the grating equation:

$$N\lambda = D \sin \theta$$

applies as a result of this wavelength difference. N is the order of the image which is formed; $\lambda$ is the wavelength of the light; $\theta$ is the angle at which the light is diffracted; and $d$ is the distance between grating spaces. The spatial frequency of the grating is $1/d$ or the number of lines per centimeter in the gratings.

Refer next to FIG. 4b, which shows a different kind of plane grating. The grating generally indicated at 17 contains thick portions 18 and thin portions 19. An assumption is made that the index of refraction of the grating material is different from that of air and thus, a retardation of the waves passing through the thicker portions 18 with respect to the thinner portions 19 will occur. As above indicated, if the waves 20 pass through the grating 17, the waves passing through the thicker portion 18 will be retarded relative to the waves passing through the thinner portion 19. Further, the waves 20 prior to passing through the member 17 are in phase, and again, after passing into air are in phase. The net difference is the retardation affected by the grating 17. To achieve a 180° phase difference, the thickness of the material areas 18 and 19 must be $T = \lambda/2(n_1 - n_2)$ where $n_1$ is the index of refraction of the material that the grating is made of and $n_2$ is the index of refraction of air. The practical effect of retardation of half the phase of the wave is, again, diffraction, which is identical in result to that described in conjunction with FIGS. 3 and 4a. However, with the grating of FIG. 4b, the rays 20 are not blocked or scattered as in the conventional line grating and it has been empirically determined that the intensity of the light emitted by a grating of type of FIG. 4b is four times as intense as that emitted by a conventional lined grating.

Off-axis holograms can be thought of as a super-imposition of plane grating in which the grating is clustered about some central frequency. For example, if the central frequency is given by $1/D_0$, then diffraction will occur principally around regions in which $N\lambda$ is equal to $D_0 \sin \theta$. Drawing 5 is illustrative of the diffraction which is occasioned by illuminating a hologram with plane waves. Some of the plane waves 21 incident upon the hologram 22 pass undiffracted into the central order. However, during reconstruction, since each small area of the hologram acts as a grating, in accordance with the above discussion some of the light is diffracted into the virtual first and real first orders. Each small area on the hologram acts as a grating and thus determines the amplitude and phase of the light diffracted into the upper and lower beams from that area of the plate. The upper beam is identical to the lower beam from each area. In all aspects including intensity the upper beam is identical to the lower beam, other than that the phases are reversed. That is, the entire upper wave, or virtual first order image is a combination or mosaic of waves produced by the individual small areas and thus, has the same amplitude and phase distribution as the original object wave. An eye placed in the upper beam looking back through (not at) the hologram, will see a virtual image of the object. In the lower or real first order image beam, the amplitude distribution is identical to that of the upper first order beam, but the signs of all the phases are reversed. Therefore, a real image is produced by the lower beam.

Thus, as illustrated in FIG. 5, while the garbled image of the on-axis hologram which prevented widespread use of the approach was eliminated by means of the off-axis hologram technique, the use of the reconstruction energy is highly inefficient in that many spurious orders, other than the desired order are created. That is, a large amount of reconstruction energy passes into the central order and as much reconstruction energy is present in the undesired first order image as is present in the desired one. Additionally, as discussed above, for computer-generated holograms an inordinate amount of computer time is required since the information used to form the undesired orders must necessarily be calculated and plotted through use of conventional computer-generated hologram techniques. This great amount of requisite computer time has severely limited the applications available to computer-generated holograms.

Refer next to FIG. 6, wherein is shown a kinoform 24 having incident upon it plane waves 25 which are phase modified to provide a real image 26 in the zero order. Certain desirable characteristics, as illustrated, are attendant the use of a kinoform. First, there are no spurious orders created. The kinoform is on line and all of the incident energy from the plane waves 24 passes into image 26. Secondly, since only one order is created, when kinoforms are created by means of computer techniques, the requisite calculation time is much less than that required to create a conventional hologram. While in FIG. 6 the waves 24 are illustrated as being plane waves, kinoforms may be designed for use with any known wave form.

The kinoform is made of transparent material, and thus, all of the energy incident upon it passes through it. The transparent material is etched or bleached in a controlled manner to provide relief and since the index of refraction of the kinoform material is greater than that of air, there are relative differences in the phases of the waves after they pass through the kinoform. Thus, the kinoform acts only upon the phase of the wavefront. The wavefront from any given object can be described as $$W = A(X, Y)e^{i\phi(x,y)}$$

that is, the wavefront is described by an amplitude A and a phase $\phi$ at each point in space. In accordance with a theorem of Lord Rayleigh, the mean value of the amplitude A, may be considered to be constant if the wavefront emanates from a large number of point sources, all with the same wavelength, but with random phases. Therefore, the phase $\phi$ of the wavefront may be shaped as illustrated in FIG. 6 to form a wavefront without consideration of amplitude. This assumption of a constant amplitude across the plane in accordance with the Lord Rayleigh theorem, is based on the likening of the optical phases to simple harmonic oscillators, having equal amplitudes but with randomly distributed phases. According to Lord Rayleigh, if the amplitudes are taken to be unity, then the intensity of the super-position of the harmonic motion is:

$$I = \left(\sum_{n=1}^{N} e^{i\phi_m}\right)\left(\sum_{m=1}^{N} e^{-i\phi_m}\right)$$

The summation includes N terms, each equal to unity, which represent the summation over the oscillators, as if they were incoherent, and a double sum:

$$\sum_{n=1}^{N=1} \sum_{m=1}^{N} e^{i(\phi_n - \phi_m)}$$

which represents the beating of each oscillator with every other oscillator. If the phases are random, these terms are as likely to be positive as to be negative, and so the total intensity averages to N. This implies that the wave has an average amplitude given by $\sqrt{N}$. Rayleigh's theorem is a statistical one. The above in a straightforward manner can be extended to the case of non-unit amplitudes.

The implication of the theorem is that a suitable reconstructed image can be obtained, if a wave of unit amplitude is processed so as to shape the phase of the wavefront appropriately. Thus all that is needed to form the image is a phase object of constant transmissivity. The easiest phase shaping technique is that which is used in refractive optics; namely, it is the difference of the velocity of light as travels through one medium, in comparison with that as it travels through another medium. For example, consider a wave which is incident upon a piece of glass divided into two sections, with one section thicker than the other. The portion of the wave incident upon the thicker section is retarded relative to the portion travelling through the air. Once both portions are in the glass, they travel at the same velocity, as they do when they re-emerge into air. The result is that as they emerge into the air, the wave which passed through the thicker section is retarded relative to the portion which passed through the thinner section. The retardation of the portion of the wave relative to the other will produce an interference pattern as they are propagated away from the glass.

If the kinoform is etched to retard the phases, the wavefront emanating from a specific set of point sources is reproduced and when this wavefront is viewed a virtual image of the set of point sources is seen. If the kinoform is etched to retard the phases to reproduce the conjugate of the wavefront, upon observation, a projected real image is seen.

While in the preferred embodiment a medium having a single index of refraction is shown as the basic kinoform medium, it will be obvious to those skilled in the art, that the areas of the medium could be of different indices of refraction which likewise would accomplish phase retardation, and further that waves other than light, such as ultrasonic or microwaves, could be shaped by appropriate kinoforms.

Figure 7:
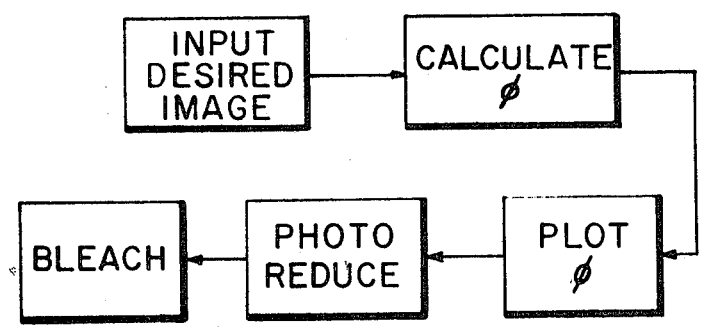
FIG. 7 is a block diagram illustrating the steps which must be taken to produce the novel kinoform, which is the subject of the present invention.

Refer next to FIG. 7, which illustrates in block form, the basic steps taken in producing a kinoform. As indicated, the desired image is input into a calculating means, such as a computer, wherein the phase is calculated. The input media may be in the form of punched cards, wherein the image amplitudes over the XYZ coordinates are specified. The wavefront from the image at the kinoform plane is computed as will later be described in detail, and the phase of the wavefront is obtained. The phase or its conjugate, depending upon the type of image desired, is plotted on a plotter with for instance, 32 gray levels, such that the phase ranges from 0 to $2\pi$ over the scale. The plot is then photo-reduced to the appropriate size for illumination by convenient, coherent light sources. This photo-reduced device is then bleached and the bleach etches the surface of the photo-reduction in proportion to the darkening of the photographic reduction.

The generation of the wavefront is performed as follows: The wavefront scattered from an object can be described in the kinoform plane as:

$$h(x,y,z_0) = \int T(a,b,c) F(x-a, y-b, z_0-c) \, da\, db\, dc$$

where the object $T(a,b,c) = T_r(a,b,c) e^{i\psi(a,b,c)}$ is described by a real transmittance (or reflectance) $T_r(a.b.c)$ and a phase shift $\psi(a,b,c)$. F is an appropriate complex-valued function which describes the propagation of the light from the point $(a,b,c)$ in the object to the point $(x,y)$ on hologram plane. (F depends upon the type of illumination used.) The function of $\psi(a,b,c)$ models either the diffuse scattering (phase changes of the wavefront at the object) from a three-dimensional object or the diffuser plate used in a transmission hologram apparatus.

The function $\psi(a,b,c)$ used to describe the diffuse scattering of light from the object introduces a considerable problem. In general the spatial frequencies in a diffracted wave obtained without the function $\psi(a,b,c)$ are low. However, introduction of, for example, a random function for $\psi(a,b,c)$ leads to extremely high spatial frequencies limited only by the aperture of the hologram. The computations needed to directly model this phenomena increase beyond reasonable bound, and alternative approaches to achieving a "spread" of information had to be developed.

The most fruitful approach is that in which the object is thought of as a collection of discrete point apertures, each aperture radiating a spherical outgoing wave. A random phase for the wavefront incident upon the apertures is assumed. In one dimension and for a single aperture, the Kirchoff diffraction theory gives the propagation of the wavefront as:

$$h(x, a_j) \approx c \int_{a_j - \delta/2}^{a_j + \delta/2} e^{\frac{i\pi}{\lambda z}(x-a)^2} e^{i\alpha(a)} da$$

for an aperture of length $\delta$ centered at $a_j$ and propagated a distance $z$, and for $z \gg |x-a|$ and where $\alpha(a)$ is a random function. As $\delta \to 0$ $$h(x, a_j) \approx c' e^{\frac{i\pi}{\lambda z}(x-a_j)^2} e^{i\alpha(a_j)}$$

For several point apertures, each of transmittance $T_r(a_j)$ and having a phase shift $\alpha(a_j)$, $h(x,a_j)$ is summed over $a_j$ to obtain $$h(x) = \sum_{j=m/2}^{\frac{m-1}{2}} T(aj) h(x, aj) = c' \sum_{j=-m/2}^{+\frac{m-1}{2}} T(aj) e^{iK(x-a_j)^2}$$

where $K = \pi/\lambda z$ and $T(a_j) = T_r(a_j) e^{i\alpha(a_j)}$.

Rewriting the above equation yields $$h(x) = c' e^{iKx^2} \sum_{j=-m/2}^{m/2-1} T(aj) e^{iKa_j^2} e^{-2iKa_j x}$$

The evaluation of this sum at equally spaced points, so that $a_j = j\Delta a$ and $x_l = l\Delta x$, results in $$h(x_l) = c' e^{iKx^2} \sum_{j=-m/2}^{m/2-1} T(a_j) e^{iK(\Delta a)^2 j^2} e^{-2iK\Delta a \Delta x l j}$$

where $l = -m/2 \ldots m/2-1$.

If in addition the relationship $\Delta x = \lambda z/\Delta am$, is assumed, then $$h(x_l) = c' e^{iK(\Delta x)^2 l^2} \sum_{j=m/2}^{m/2-1} T(a_j) e^{iK(\Delta a)^2 j^2} e^{-2\pi i l j/m}$$

This can be rewritten as $$h(x_l) = c' e^{\begin{array}{c} iK(\Delta x)^2 l^2 \\ iK(\Delta a)^2 j^2 \end{array}} \widehat{TE}(x_l)$$

where $TE(a_j) = T(a_j) e$ and $\widehat{TE}$ is the finite Fourier transform of TE. $\widehat{TE}(x_l)$ is a periodic function of $l$, with period $m$ and containing one element for each element of the object array. Repetitions of that sum contribute to a "spread" of the information, and kinoforms made using these techniques can be made as redundant as optical holograms. Increasing the number of repetitions implies that $m \cdot \Delta x \ll m \cdot \Delta a$ is desired; i.e., $\Delta x \ll \Delta a$. $m\Delta x$ should be smaller than the diameter of the lens viewing the kinoform so that at least one period would be visible at any instant. For example, if the virtual image is examined by eye, the diameter of the pupil should be greater than $m\Delta x$.

It should be noted that the term before the sum is not periodic in general. Also since $h(x)$ is a continuous function, it must be sampled correctly, that is, $\Delta x$ must be small enough so that $h(x_l)$ is a good approximation to $h(x)$.

During calculation, the image is considered to be a three-dimensional array of point apertures. Each aperture is assigned a value between zero and one, where zero implies that no light is transmitted through the aperture, one implies an open aperture, and the values between represent the relative transmittance of the apertures. In one program actually run each plane had a grid of 64 x 64 apertures. There may be an arbitrary number of such planes.

The first step in generating the plot tape is the calculation of the finite Fourier transform of function $TE(a_j)$. In this calculation zeros are appended to the $TE(a_j)$ array so that it is a vector of $m$ elements. This interpolates the $h(x)$ array. Thus, $$\widehat{TE}(l/p) = \sum_{j=-m/2}^{m/2-1} T(a_j) e^{iK(\Delta a)^2 j^2} e^{2\pi i (l/p) j/m}$$

and in the interpolate transform.

$$\widetilde{TE}(l/p) = \sum_{j=-n/2}^{n/2-1} T(a_j) e^{iK(\Delta a)^2 j^2} e^{2\pi i l j/n}$$

where $n = pm$, and $T(a_j) = 0$ for values of $j = -n/2$, $-n/2+1 \ldots -m/2-1$, and $j = m/2, m/2+1 \ldots +n/2-1$. $l$ has the range from $-n/2$ to $n/2-1$.

Since the array $\widetilde{TE}$ is of period $n$, it may be repeated as many times as necessary, to provide a kinoform as large as desired, and of arbitrary redundancy.

Many of the steps required to construct a kinoform, as above indicated, are highly similar to those used in plotting or constructing a digital hologram. Thus, the point aperture assumption is made to alleviate computational complexity in the plotting of a kinoform can also be made in the plotting of a digital hologram. The first kinoform actually constructed was made up of apertures selected to form the letter B and the wavefront was calculated as outlined above.

Again, summarizing, a mathematical description of the formation of a kinoform is as follows: The desired image amplitude, $T_R(a,b)$ is specified and a random phase factor $\exp[i\phi(a,b)]$, which simulates ground glass is generated and multiplied upon $T_R$: $T = T_R \exp[i\phi]$. The backward propagation of complex wave amplitude T from the image plane to hologram plane is computed by means of the Fresnel transformation $T*F = |h| \exp[i\phi(x,y)]$. The phase distribution $\Phi(x,y)$ is plotted as amplitude by means of a 32 gray level plotter and the plot is photographically reduced on Kodak Minicard film and the photoreduction then bleached using a conventional dichromate bleach, which yields a complex amplitude transmittance $\exp[i\Phi(x,y)]$.

It should be noted, with respect to the above brief mathematical description of the formation of a kinoform that the important point is that only phase distribution is calculated and nowhere are the amplitude variations considered due to the basic assumption based on Rayleigh's theorem that where rays of random phase are incident on a plane, as above discussed the amplitude may be taken as being constant. Thus, with the introduction of the random phase factor $\exp[i\phi(a,b)]$, which simulates the ground glass or the point aperture format, the need for considering amplitude in the calculation of the wavefront to be plotted is alleviated.

The bleaching of the photoreduction for a kinoform must be performed with much more care than is required for conventional bleached holograms. The relief of the emulsion must be such that light incident upon a region of $\phi=0$ will be retarded by one wavelength, compared with the light incident upon a region of $\phi=2\pi$. When phase matching is achieved, almost all of the light incident upon the kinoform will be present in the desired image. Again, there are no spurious orders.

Thus, in the above described manner, there has been provided a novel technique for producing an image-forming member which has all the advantages attendant the usual computer-generated hologram, in that among other things, each area of the member contains the total information incident upon the total member. Thus, for read only store applications, scratches or obliterations of part of the kinoform storage media will not result in a loss of information. The advantages attendant the subject novel technique over conventional computer-generated hologram techniques are great. Based on the point aperture approach which approximates random phase taken with Lord Rayleigh's theorem wherein the amplitude factor of the wavefront is considered to be constant only phase information must be calculated. An additional advantage above discussed is that the spurious orders which are calculated normally during the plotting or generating of computer-generated holograms no longer need be plotted with a resultant great reduction in required computing time. Furthermore, the kinoform, since all of the incident reconstruction energy is placed in the desired central order, is quite efficient, which efficiency opens many applications for a hologram-type member, which heretofore, have not been possible, due to the requirements of intense light sources and for separation of the desired image from the spurious orders, wide or high spatial frequencies, which again, necessitated in ordinate amounts of computer time.

While the invention has been particularly shown and described with reference to several embodiments, it will be understood by those skilled in the art that various changes in form and detail may be made without department from the spirit and scope of the invention.

What is claimed is:

1. The method of generating a single image at an image plane comprising the steps of:
    (A) calculating by machine the phase distribution $\phi(x,y)$ required to produce said desired image by:
      (1) specifying the amplitude of each desired image point and assigning a random phase factor to each such point,
      (2) calculating the form at a desired plane of a wave front which would propagate from an image having said specified amplitude and phase, and
      (3) setting all the amplitude factors in said calculated wave form to a uniform value so as to produce said required phase distribution;
    (B) constructing an object having controlled phase retarding areas in accordance with said required phase distribution, and
    (C) beaming waves on said object to selectively retard said waves with resultant interference at said image plane in the pattern of said image and with substantially no diffraction of said waves into other than the desired order.

2. The method of claim 1 wherein said waves are coherent light waves from a coherent light source.

3. The method of claim 1 wherein said waves are monochromatic light waves.

4. The method of claim 1 wherein said waves are ultrasonic waves.

5. The method of claim 1 wherein said waves are microwaves.

6. The method of claim 2 wherein said object is light transmissive and said coherent light source is disposed on one side of said object, said image plane is disposed on the opposite side of said object and said image is on line with said coherent light source.

7. The method of claim 2 wherein said object is opaque and said coherent light waves are reflected back to said image plane disposed on the same side of said object as said coherent light source.

8. The method of claim 6 wherein said object is made of a material of substantially uniform transmissivity but with selectively varied thickness.

9. The method of claim 6 wherein said object is made of a material of substantially uniform thickness but with areas of selectively varied indices of refraction.

10. The method of claim 8 wherein said selectively varied thickness is obtained by plotting said phase distribution as amplitude on a multi gray level plotter; photographically reducing said plot; and bleaching the resultant photoreduction.

11. The method of claim 10 wherein said bleaching is controlled such that upon illumination said coherent waves incident on a region $\phi=0$ will be retarded by one wavelength compared to light incident upon a region of $\phi=2\pi$.

12. The method of claim 1 wherein said image points are placed so as to constitute a continuous function.

13. The method of claim 1 wherein said desired image points are positioned in a three dimensional array with each point assigned a value of between zero and one where zero implies that no light is propagated by said point, and one implies maximum propagation.

14. The method of generating an object which upon illumination will provide a desired image at an image plane comprising the steps of:
- (A) specifying the desired image amplitude $TR(a,b)$;
- (B) multiplying in a machine a random phase factor $\exp[i\phi(a,b)]$ on said desired image amplitude $TR=T-TR\exp[i\phi]$;
- (C) computing in a machine the backward propagation of the complex wave amplitude T from the image plane to said object by means of a Fresnel transformation $T*F=|h|\exp[i\alpha(x,y)]$;
- (D) plotting the phase distribtuion $\phi(x,y)$ as amplitude on a multilevel gray level plotter;
- (E) photographically reducing the resultant plot;
- (F) bleaching the photoreduction to provide a complex amplitude transmittance $\exp[i\phi(x,y)]$.

15. The method of generating an object which upon illumination will provide a desired image at an image plane comprising the steps of:
- (A) calculating by machine the phase distribution $\phi(x,y)$ required to produce said desired image by:
  - (1) specifying the amplitude of each desired image point and assigning a random phase factor to each such point,
  - (2) calculating the form at a desired plane of a wave front which would propagate from an image having said specified amplitude and phase, and
  - (3) setting all the amplitude factors in said calculated wave form to a uniform value so as to produce said required phase distribution; and
- (B) constructing said object having controlled phase retarding areas in accordance with said required phase distribution.

References Cited

Cathey, Jour. of the Optical Society of America, vol. 55, April 1965, p. 457.

Rigler, Jour. of the Optical Society of America, vol. 55, December 1965, p. 1693.

Stroke et al., Proc. of the IEEE, vol. 55, January 1967, pp. 109–111.

Lesem et al., Proc. of the Symposium on Modern Optics, Polytechnic Press, New York, 1967, pp. 681–691.

DAVID SCHONBERG, Primary Examiner

R. J. STERN, Assistant Examiner

U.S. Cl. X.R.

181—0.5; 343—17; 350—162

UNITED STATES PATENT OFFICE
CERTIFICATE OF CORRECTION

Patent No. 3,606,515           Dated September 20, 1971

Inventor(s) Peter M. Hirsch, James A. Jordan, Jr. & Louis B. Lesem

It is certified that error appears in the above-identified patent and that said Letters Patent are hereby corrected as shown below:

Column 8, line 35 should read as follows:

that $a_j = j\Delta a$ and $x_\ell = \ell \Delta x$, results in

Column 8, lines 36-40 should read as follows:

$$h(x_\ell) = c' e^{iKx^2} \sum_{j=-m/2}^{m/2-1} T(a_j) e^{iK(\Delta a)^2 j^2} e^{-2iK\Delta a \Delta x \ell j}$$

where $\ell = -m/2, \ldots, m/2-1$.

Column 8, line 44-45 should read as follows:

$$h(x_\ell) = c' e^{iK(\Delta x)^2 \ell^2} \sum_{j=m/2}^{m/2-1} T(a_j) e^{iK(\Delta a)^2 j^2} e^{-2\pi i \ell j/m}$$

Column 8, line 46-52 should read as follows:
This can be rewritten as $$h(x_\ell) = c' e^{iK(\Delta x)^2 \ell^2} \widehat{TE}(x_\ell)$$
$$iK(\Delta a)^2 j^2$$

where $TE(a_j) = T(a_j)$ e and $\widehat{TE}$ is the Finite Fourier Transform of $TE$. $\widehat{TE}(x_\ell)$ is a periodic function of

UNITED STATES PATENT OFFICE
CERTIFICATE OF CORRECTION

Patent No. 3,606,515            Dated September 20, 1971

Inventor(s) Peter M. Hirsch, James A. Jordan, Jr. & Louis B. Lesem

It is certified that error appears in the above-identified patent and that said Letters Patent are hereby corrected as shown below:

(2)

Column 9, line 10-15 should read as follows:

$$\widehat{TE}(\ell/p) = \sum_{j=-m/2}^{m/2-1} T(a_j) e^{iK(\Delta a)^2 j^2} e^{2\pi i(\ell/p)j/m}$$

and in the interpolate transform, $$\widehat{TE}(\ell/p) = \sum_{j=-n/2}^{n/2-1} T(a_j) e^{iK(\Delta a)^2 j^2} e^{2\pi i \ell j/n}$$

Column 9, line 18 should read as follows:

+ n/2 -1. $\ell$ has the range from -n/2 to n/2 -1.

Signed and sealed this 21st day of March 1972.

(SEAL)
Attest:

EDWARD M. FLETCHER, JR.        ROBERT GOTTSCHALK
Attesting Officer                Commissioner of Patents